United States Patent
Ito et al.

[15] 3,673,324

[45] June 27, 1972

[54] VIDEO MIXING/SPECIAL EFFECTS AMPLIFIERS

[72] Inventors: Yutaka Ito, Saitama-ken; Jun Hirate, Tokyo-to, both of Japan

[73] Assignees: Tokyo Broadcasting System Inc., Tokyo-to, Japan; Nippon Electric Company Limited, Tokyo-to, Japan

[22] Filed: Dec. 22, 1970

[21] Appl. No.: 100,557

[30] Foreign Application Priority Data

Dec. 23, 1969 Japan ................................44/104100

[52] U.S. Cl. ............................178/6.8, 178/DIG. 6, 178/7.1

[51] Int. Cl. ............................................................H04n 5/22

[58] Field of Search ................................178/6.8, 7.1, DIG. 6

[56] References Cited

UNITED STATES PATENTS 3,374,119 3/1968 Legler ..............................178/DIG. 6

*Primary Examiner*—Robert L. Richardson
*Assistant Examiner*—Joseph A. Orsino, Jr.
*Attorney*—Sandoe, Hopgood & Calimafde

[57] ABSTRACT

Amplifier apparatus for operating on plural video signals to provide signal mixing, special effects and the like employs parallel video signal processing circuits which supply their output signals to a common video mixer. A keying signal processor is included for developing control voltages for separately varying video gain in the video processing circuits on a time shared basis. The composite arrangement thereby allows independent level control for the multi-channel video information vis-a-vis control signals such as synchronizing signals and/or a color burst.

8 Claims, 3 Drawing Figures

INVENTORS
YUTAKA ITO
JUN HIRATE
BY
Sandoe, Hopgood & Calimafde
ATTORNEYS

INVENTORS
YUTAKA ITO
JUN HIRATE
BY
Sandoe, Hopgood & Calimafde
ATTORNEYS

INVENTORS
YUTAKA ITO
JUN HIRATE

BY

Sandoe, Hopgood & Calimafde
ATTORNEYS

VIDEO MIXING/SPECIAL EFFECTS AMPLIFIERS

DISCLOSURE OF INVENTION

This invention relates generally to video mixing/special effects amplifiers in the production of television programs and, more particularly, to new and improved video mixing/special effects amplifiers for performing "video mixing," "special effects," or both of these functions as an essential constituent of the studio equipment of a color television broadcasting station.

With conventional amplifiers known under the name of "video mixers" or "special effects (or montage) amplifiers," and designed to perform signal mixing or keying such as "fade-in and fade-out" (fading to/from black), "inserts," "wipes," "positioning," and the like, there arises the necessity of delivering from the output video signals containing sync signals (usually referred to as the composite video signal) as the output signal after "mixing" or "keying" has been performed by the mixing amplifier.

The conventional circuit system for such a video mixing or special effects amplifier incorporates transmission paths which permit transmission of the video and sync signals separately from each other. Stated more particularly, the conventional video mixing or special effects amplifiers may be broadly classified into two circuit systems as follows:

One system was designed to receive the video signal without sync signals (usually referred to as the non-composite video signal; the video signal always contains a color burst in case of a color television signal), and the sync signal separately from each other as inputs to the video mixing or special effects amplifier. The system adds the sync signal to the non-composite video signal at the final stage after mixing such as "dissolves," or special effects such as "wipes" have been performed between two non-composite video signals.

The other prior art system was designed to extract the non-composite video signal component from the received composite video signal at the input stage, and to add the sync signals which have been separated at the input stage to the non-composite video signal at the final stage after mixing such as "dissolves," or special effects such as "wipes" have been performed between two non-composite video signals.

With the former system, in particular, there would arise the need for installing sync signal switching apparatus in addition to video signal switching apparatus for switching between input sources. Further, synchronizing apparatus is required to maintain synchronism between the switching apparatus associated with the non-composite video and the sync signals. This rendered the overall system design extremely complex, notably with an increase in the number of input signal sources connected to these switching mechanisms or in the number of video mixing amplifiers or special effects amplifiers involved in the system.

Furthermore, the former system requires installation of a number of pulse distribution amplifiers for sync signals and the like, and a number of sync delay lines to equalize delay times for sync signals and video signals.

All of these requirements are obviously disadvantages in realizing optimum video signal transmission performance, low manufacturing cost, and a small equipment floor space requirement.

Still another drawback of the conventional system was that the difference in relative phase between the video signal and the sync signal — that is, the front porch duration, was subject to variation, which follows from the sync signals being added to the non-composite video signals at the final stage of the video mixing amplifier or special effects amplifier.

Among other drawbacks of the conventional video mixing amplifiers were the following:

In performing mixing such as "dissolves" or special effects such as "wipes," it was indispensable that the color burst in the output signal be of constant level at all times irrespective of changes in the level of the video signals, and that the difference in relative phase between the color-burst subcarrier and the chrominance component in the video signal remain unchanged.

It has been common practice with the conventional prior art system to regard the color burst as if it had been part of the video signal, and to perform level control for the video signal and the color subcarrier simultaneously in case of "dissolves," for instance. (That a special effect such as "wipes" can be effected by causing the width of a "keying pulse" to change, i.e., by switching between the video signals using a keying pulse whose duration varies with time, has heretofore been publicly known. Such a special effect is performed by controlling the level of video signals during the rise and fall times of the keying pulse — that is, during a brief time interval of the order of 0.1 microsecond).

For these reasons, a particular device for maintaining the color burst at a predetermined level would be installed, as for eliminating the color burst, at a stage immediately after that at which mixing such as "dissolves" was performed. Subsequently, a new color burst of constant level, which had been created by gating a color subcarrier of external origin is reinserted. In using such a device, the color subcarrier used for the reinsertion of the color burst had to be in perfect phase coincidence with the chrominance subcarrier in the video signal after the termination of the gain control such as "dissolves."

It is therefore an object of this invention to provide a simple and economical video mixing/special effects amplifier with improved video signal transmission performance which overcomes the above mentioned difficulties or drawbacks of conventional designs by principally using composite video signals as inputs to the amplifier, dispensing with the need for installation of sync signal switching apparatus, reducing the number of both pulse distribution amplifiers and pulse delay lines to a minimum, thereby simplifying the overall system design.

Another object of this invention is to provide a versatile video mixing/special effects amplifier incorporating a transmission circuit system which will produce no changes in duration of the front porch (without the need for adjustment after installation) in mixing or keying between video signal such as "dissolves" or "wipes."

Still another object of this invention is to provide a video mixing/special effects amplifier of a circuit system capable of delivering from its output a color burst at the same level as the color burst contained in the input video signal, and which can maintain proper phase relationships with the chrominance in mixing or keying between video signals, such as "dissolves" or "wipes," without the need for a color subcarrier of external origin.

The circuit structure of a video mixing/special effects amplifier according to this invention essentially includes two or more identical circuit arrangements connected in parallel, each arrangement comprising a video clamping circuit and a serially connected video gain control circuit. A video mixer is connected to the outputs of the circuit arrangements, and a keying signal processor is provided.

One important feature of the present invention resides in the preparation by the keying signal processor of two distinct control voltages for application to each of the video gain control circuits on a time-shared basis so that level control of the sync signal and/or the color burst may be effected independently from that of the video signal, or that portion of the composite signal excluding the sync signal and/or the color burst.

The above mentioned and other objects and features of this invention will become apparent by reference to the following detailed description of specific illustrative embodiments thereof, taken in conjunction with the accompanying drawings, in which.

Figure 1:
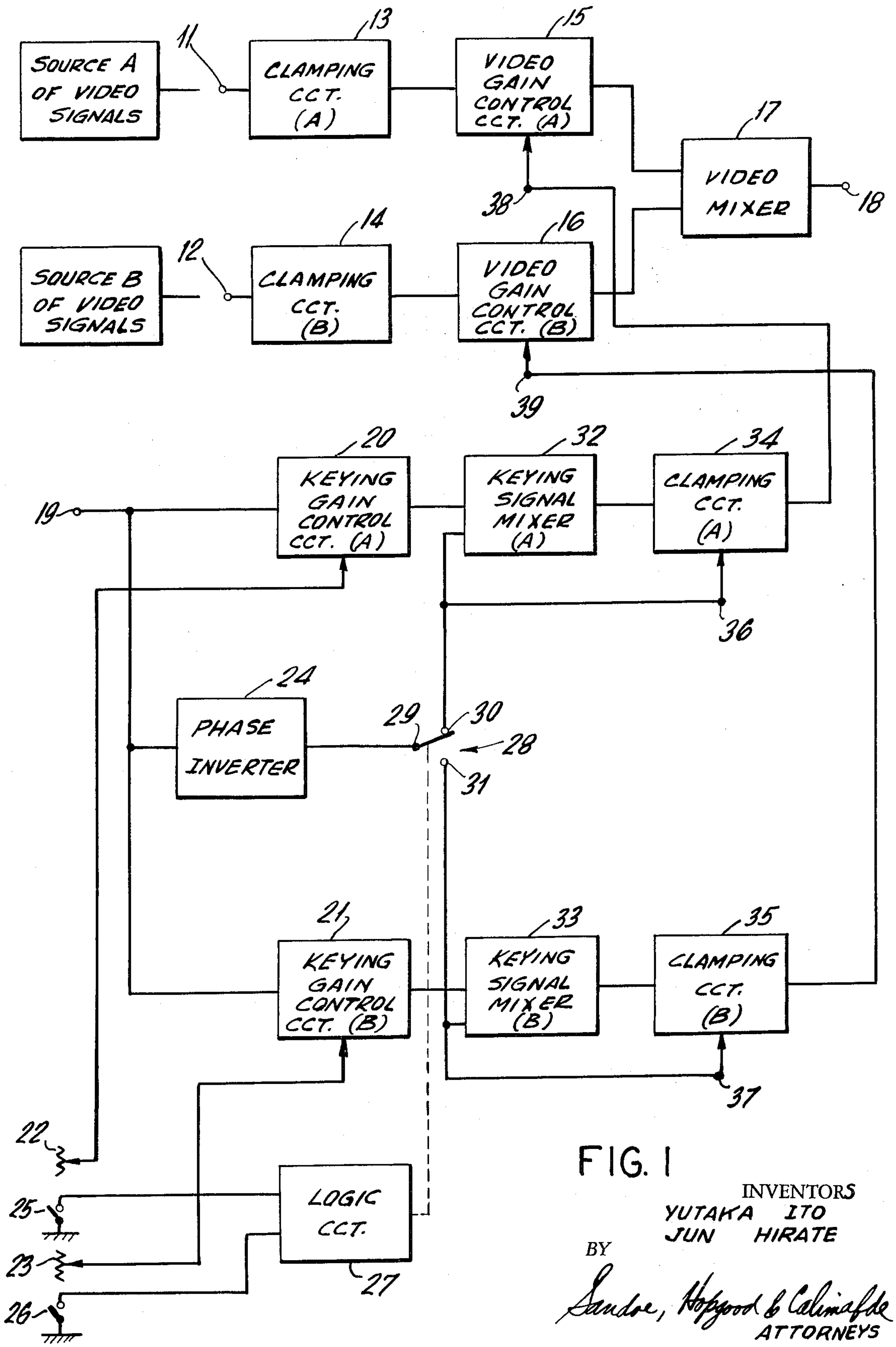
FIG. 1 is a block diagram of a video mixing amplifier according to an embodiment of the present invention.

Referring now to FIG. 1, there is shown a first embodiment of the present invention which includes a video mixing amplifier for performing "dissolves," "fade-in," "fade-out," "supers" and the like between two composite video signals. Two composite video signals of channels A and B are applied to terminals 11 and 12 for sources thereof, and the blanking levels of the two composite video signals are respectively clamped by a channel A clamping circuit 13 and a channel B clamping circuit 14.

These clamping circuits are intended to prevent the fluctuation of each of the blanking levels that would otherwise occur in effecting level control, as will be discussed, at the subsequent video gain control stage due to the fluctuation of the average picture level of each of the A and B channel input signals.

The output of A-channel clamping circuit 13 is fed to an A-channel video gain control circuit 15 to be controlled in amplitude by a control voltage supplied to an input terminal 38 of the circuit 15. In like manner, the output of B-channel clamping circuit 14 is fed to B-channel video gain control circuit 16 to be level-controlled by a control voltage supplied to an input terminal 39 of the B-channel video gain control circuit. The outputs of the video gain control circuit 15 and 16 are mixed together before delivery to the video output terminal 18.

Figure 2:
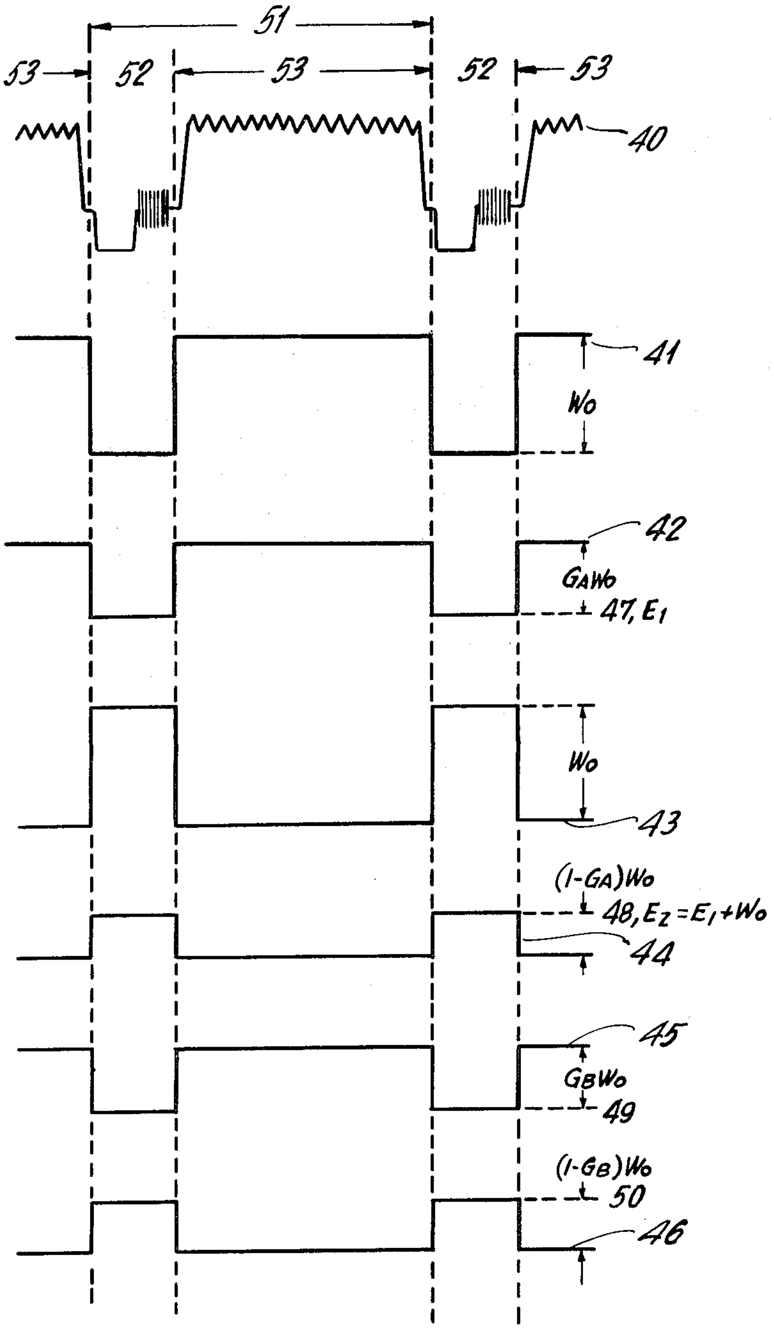
FIG. 2 is a diagram of signal waveforms exhibited at various points in the video mixing or special effects amplifier shown in FIGS. 1 or 3.

Proceeding now to a description of the video gain control signals for both channels, reference is also made to the waveforms of FIG. 2. For ease of understanding, it is assumed in the following description that any gain control circuit is so formed such that its gain increases with increasing DC control voltage. Most suitable examples for the gain control circuit are disclosed in Japanese Pat. publication No. 50383/1964 and Pat. application No. 17283/1968, now pending in Japan. However, any other kind of video gain control circuit may be used in realizing a video mixing/special effects amplifier according to this invention, provided the circuit is designed to have performance suitable for fading control and keying.

Referring to FIG. 2, there is shown an arbitrary composite signal 40 containing a sync signal and a color burst; one horizontal scanning period 51; a period 52 containing the sync signal and the color burst; a video signal period 53 devoid of the sync signal and the color burst, and a source signal 41 for controlling the video signal level — that is, a keying input signal with pulse level W*o* and pulse duration equal to the period 53. The keying input signal 41 can readily be obtained from the sync signal separated, for example, from the input composite video signal.

It will be seen that the trailing edge of the keying input signal falls within the front porch period of the composite video signal. Such a phase relationship can be obtained, for example, after acquiring proper timing in creating the keying input signal from the composite video signal, by causing the composite video signal to be delayed a brief time.

A waveform 42 shown in FIG. 2 comprises a replica of the keying input signal 41 which has been controlled as to its amplitude level by a video gain control circuit with a gain GA ($O \leq GA \leq 1$), the level being $G_A$W*o*; a phase-inverted waveform 43 comprises the keying input signal 41, having an amplitude W*o*; a waveform 44 obtained by mixing the waveforms 42 and 43, the level of the resulting signal 44 being $(1-G_A)$ W*o*; a waveform 45 comprises the keying input signal 41 which has been controlled in magnitude level by video gain control circuit with a gain GB ($O \leq G_B \leq 1$), the level being $G_B$W*o*; and a waveform 46 is obtained by mixing the waveforms 43 and 45, the level being $(1-G_B)$ W*o*.

Returning now to the description of the video mixing amplifier of FIG. 1, and with reference to FIG. 2, assume that the keying input signal applied to the keying input terminal 19 is of the waveform 41 shown in FIG. 2. The keying input signal is fed to both an A-channel keying gain control circuit 20 and a B-channel keying gain control circuit 21 to be level-controlled respectively by direct current control voltages produced at an A-channel fader control 22, and a B-channel fader 23. The amplitude of the outputs of these keying gain control circuits are assumed to be $G_A$W*o* and $G_B$W*o* as has been mentioned with reference to FIG. 2.

The keying input signal is also fed to a phase inverter 24 and the phase-inverted signal appears at an input terminal 29 of a sync gate pulse switcher (herein switch) 28 (or base/super channel selector). The waveform of the signal at the input terminal 29 is therefore the waveform 43 in FIG. 2. The waveform of the signal appearing at the input terminal 29, as will be described in detail, determines which of the two channels, A and B, is to be used for passing the sync signal and the color burst for end arrival at the output terminal 18. This signal will be referred to as the sync gate pulse hereinafter.

With the input terminal 29 of the sync gate pulse switch 28 connected to the output terminal 30 of the switch as illustrated, both the output of the A-channel keying gain control circuit 20 and the sync gate pulse are fed to the A-channel keying signal mixer 32 to be mixed together. The output waveform of mixer 32 comprises the waveform 44 shown in FIG. 2. The output of the A-channel keying signal mixer 32 is clamped by the A-channel keying signal clamping circuit 34 and its output is applied to the A-channel video gain control input terminal 38 for controlling the A-channel video signal level.

It will be seen at this point that the clamping pulse time position of the A-channel video gain control signal falls within the period 52 shown in FIG. 2, and that, the magnitude of the clamping potential is determined according to the presence or absence of the sync gate pulse applied to an A-channel keying clamp potential input terminal 36 of the A-channel keying signal clamping circuit 34.

More specifically, the output of the keying signal mixer 32 is clamped to the DC potential $E_2$ for full gain (100percent) of the A-channel video gain control circuit 15 when the sync gate pulse is applied to the A-channel keying clamping potential input terminal 36, whereas it is clamped to $E_1$ for reducing the output level of the circuit 15 to zero in the absence of the sync gate pulse at the terminal 36.

Therefore, with the switch 28 connected as illustrated, the potential 48 (referring to the waveform 44 shown in FIG. 2) is clamped to the DC potential $E_2$, whereby the sync signal and the color burst of the A-channel composite video signal, both maintained at the 100 percent level, are delivered to the video output terminal 18.

If the gain of the A-channel keying gain control circuit 20 is controlled by the A-channel fader 22, the factor $G_A$ shown at waveform 44 in FIG. 2 varies which, in turn, causes the level of the video signal — that is, that part of A-channel composite signal excluding the sync signal and the color burst, to be controlled. In this case, it is necessary that the amplitude W*o* of the waveform 44 for $G_A$ to be so adjusted that the DC potential of the A-channel video gain control signal during the interval 53 becomes equal to the DC potential $E_1$ for cutting off the video signal level. It then becomes possible to completely fade-in or fade-out the A-channel video signal during the interval 53 by use of the A-channel fader 22.

Correspondingly, the output of the B-channel keying gain control circuit 21 and the output of the sync gate pulse switch 28 are fed to the B-channel keying signal mixer 33 to be mixed together. With the switch 28 as illustrated, no sync gate pulse will be applied to the switcher output terminal 31, with the result that only the output of B-channel keying gain control circuit 21, comprising of waveform 45 shown in FIG. 2, is fed to the B-channel keying signal mixer 33.

The output of the B-channel keying signal mixer 33 is clamped by the B-channel keying signal clamping circuit 35, and its output is applied to the B-channel video gain control input terminal 39 to control the B-channel video signal level. In this case, the clamping time position of the B-channel video gain control signal falls within the interval 52 shown in FIG. 2 in the same manner as in case of channel A. The magnitude of the clamping potential is determined by whether or not there is present a signal applied to a B-channel keying signal clamping potential input terminal 37 of the B-channel keying signal clamping circuit 35 as in case of channel A.

More specifically, the output of the B-channel keying signal clamping circuit 35 is clamped to a DC potential which makes the gain of the B-channel video gain control circuit 100 percent in the presence of the sync gate pulse applied to the B-channel keying signal clamping voltage input terminal 37, whereas it is clamped to a DC potential which reduces the gain of the B-channel video gain control circuit 16 to zero in the absence of the sync gate pulse applied to the input terminal 37.

Accordingly, referring to waveform 45 in FIG. 2, it is seen that the voltage level shown at 49 is clamped to a potential which nullifies the gain of the B-channel video gain control circuit 16 with the switch 28 connected as illustrated. Therefore, both the sync signal and the color burst contained in the B-channel composite video signal are eliminated before delivery to the video output terminal 18. By actuating the gain of the B-channel keying gain control circuit 21 using the B-channel fader 23, the value of $G_B$ shown at waveform 45 in FIG. 2 will vary, whereby the level of the video signal (i.e., that part of the B-channel composite signal excluding the sync signal and color burst components) can be controlled.

Suppose that for $GB = 1$, or when the amplitude of waveform 45 is $Wo$, $Wo$ is so set that the DC potential of the B-channel video gain control signal within the period 53 takes a value which makes the gain of the B-channel video gain control circuit 16 100 percent. It then becomes possible to fade-in or fade-out the B-channel video signal in the period 53 by use of the B-channel fader 23.

As can readily be understood from the foregoing description, operation of the switcher 28 enables the sync signal and the color burst of either channel, A or B, to be delivered to the video output terminal 18.

The switching method of the switcher 28 may be illustratively constructed as follows:

A switch 25 has contacts which close only when the A-channel fader 22 causes the A-channel video signal to fade out (that is, fade to black), while a switch 26 has contacts which close only when the B-channel fader 23 causes the B-channel video signal to fade out. The "on" – "off" information of these contacts becomes input signals for the logic circuit 27.

The logic circuit 27, is adapted to select by use of the information either channel A or B in which the fade-in (fading from black) of the video signal has been performed first and to select either channel A or B in which the fade-out has occurred later in point of time when a fade-out (fading to black) takes place in both channels A and B.

The output of the logic circuit 27 controls the sync gate pulse switch 28 in such a way that the sync gate pulse at the input terminal 29 will be delivered only to the output terminal 30 when the circuit 27 selects the A-channel, whereas it will be delivered only to the output terminal 31 when the B-channel is selected.

It becomes possible with such a switching apparatus design to deliver to the video output terminal 18 the sync signal and the color burst in the same channel (to become the base channel) as the video signal which has been delivered first; with the result that the sync signal and the color burst in the other channel (to become the superimposed channel) are prevented from reaching the terminal 18. In other words, the sync signal and the color burst of the base channel are delivered to the video output terminal 18 at a constant level (the same level as the selected video channel input) irrespective of the fader lever positions of both A and B channels. Also, the relative phases of the sync signal and the color burst remain unchanged with respect to the video signal.

The reason why switchover between the two channels for delivery of the sync signal and the color burst to the video output terminal 18 is taken into account by the switch 28 is that transmission of the composite video signal of either channel (which becomes the base channel) must be secured even where synchronism collapses between two composite video signal inputs of the channels A and B, or in case of failure of the composite video signal of the alternate channel (which becomes the superimposed channel).

In order to make transmission of the color composite video signal of either channel (to become the base channel) possible in the former case, the keying input signal must be in synchronism with the channel to become the base. For this purpose, there arises the necessity of providing structure (abbreviated for simplicity in the diagram of FIG. 1) for generating the keying input signals synchronized with each of the input composite video signals of the A and B channels, and structure for switching between these keying input signals simultaneously with operation of the switch 28 so as to select the desired channel to apply the selected keying input signal synchronized with the video signal to be sent to the keying input terminal 19.

Figure 3:
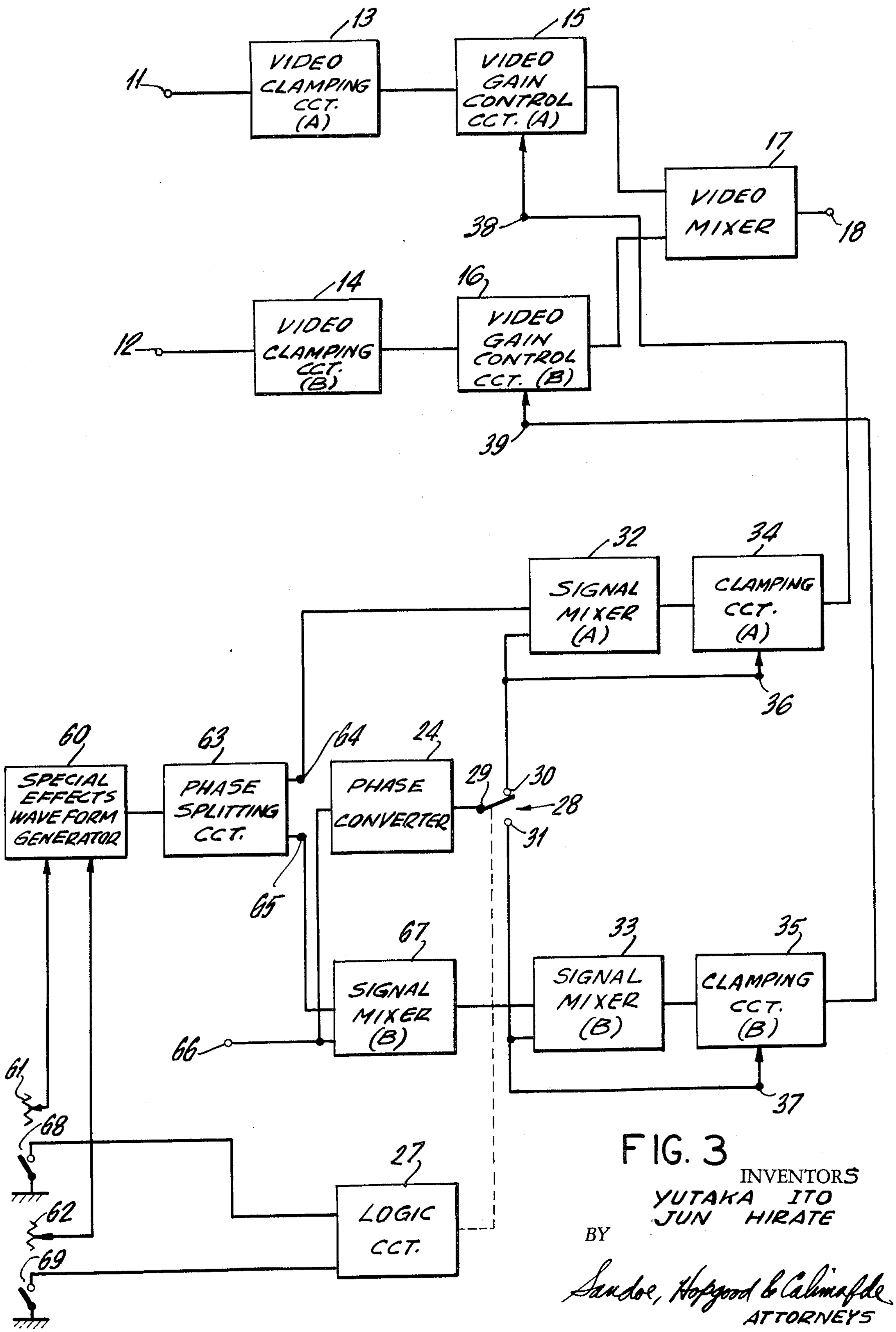
FIG. 3 is a block diagram of a special effects amplifier according to another embodiment of this invention.

A second embodiment of the present invention shown in FIG. 3 provides a "special effects" amplifier for performing "-wipes," "positioning," and the like between two composite video signals. This second embodiment does not differ from the first embodiment thereof in the provision of a video signal input terminal 11, a video clamping circuit 13, a video gain control circuit 15, an input terminal 38 for the video gain control signal, this structure being for the A-channel; and a video signal input terminal 12, a video clamping circuit 14, a video gain control circuit 16, and an input terminal 39 for a video gain control signal, as well as in the relationship and coaction of such circuit elements.

Referring to FIG. 3, a known special effects waveform generator 60 and its output waveform is assumed to be a non-composite signal. Control of "wipes" is performed by horizontal and vertical-direction control levers 61 and 62.

The output of the waveform generator 60 is fed to a phase-splitting circuit 63, with the result that keying signal waveforms of positive and negative polarities appear respectively at terminals 64 and 65.

Let it be assumed that the levels of both keying signal waveforms are set at Wo (the same as for the first embodiment) and the range in which the pulse width varied by wiping control corresponds to the period 53 shown in FIG. 2, and that the keying signal waveform for maximum pulse width corresponds to the waveforms 41 or 43 in FIG. 2.

The positive polarity keying signal of such a waveform is applied to the A-channel keying signal mixer 32, whereas the negative polarity keying signal of this waveform is applied to the mixer 67. Furthermore, pulses applied to terminal 66, having the same waveform as the waveforms 41 in FIG. 2, enter the mixer 67 and also the phase inverter 24. The negative polarity keying signal waveform and the pulse waveform are mixed by the mixer 67 and the mixed product enters the B-channel keying signal mixer 33.

The functions of the A-channel keying signal mixer 32, the keying signal clamping circuit 34, the keying clamp potential input terminal 36, the B-channel keying signal mixer 33, the keying signal clamping circuit 35, the keying clamp potential input terminal 37, the phase inverter 24, the input terminal 29 for the sync gate pulse switch 28, the output terminals 30 and 31 for the switch, as well as their coaction, do not depart from the first embodiment of this invention.

The principle difference between the embodiments of FIGS. 1 and 3 are that both $G_A$ and $G_B$, which vary from 0 to unity in the first embodiment, are fixed to unity in the second embodiment, and that fade-in or fade-out operation mentioned in connection with the first embodiment corresponds to a wiping operation for the second embodiment. In other words, fading to/from black, and the like are accomplished by changes in the amplitude direction of the keying signal, whereas "wipes," "-positioning," and so forth are accomplished by changes in the time direction of the keying signal.

A switch 68 provides contacts which close when the output picture screen is occupied by the A-channel video signals appearing at the video output terminal 18 in the case of wiping, whereas the switch 69 provides contacts which close when the full picture is occupied by the B-channel video signals. The "on" – "off" information of these contacts become input signals for the logic circuit 27. The function of the logic circuit 27, and the relationship between its output and the switch 28, are exactly the same as those for the first embodiment. Thus wiping can be performed and, further, the sync signal and the color burst, are each maintained at a predetermined constant level (the same level as the selected video channel input). Also, the same phase relations with respect to the video signal can be delivered to the video output terminal 18.

In order to make transmission of the composite video signal of either channel (which becomes the base channel) possible for the embodiment of FIG. 3, both the output of the waveform generator 60 and the sync gate pulse applied to the terminal 66 must be in synchronism with the channel to become the base channel in the same manner as mentioned previously.

A third embodiment of this invention (not shown) can be realized by replacing the special effects waveform generator 60 in the second embodiment with a keying gain control circuit so that a non-composite monochrome "letter" signal, for example such as for "titles," may be applied as inputs to both the keying gain control circuit and the video gain control circuit to become the super channel, and the keying gain control circuit may be controlled by the fader 61 or 62 which corresponds to the super channel. This technique is fully disclosed in a Japanese treatise entitled "Mix-and-Gate Amplifier" by Y. Ito, H. Naito, Tokyo Broadcasting System Inc., Television Technical Dept., which is printed in "Pre-print of Technical Conference of the Institute of Television Engineers of Japan;" Vol. 5, October, 1968.

The character signal insertion may then be effected in the form of "dissolves" (that is, the effect of fading to black of the character signal portion only of the superchannel in the base channel video signal and simultaneously, fading from black for the superchannel).

A fourth embodiment of this invention (not shown) which may be called a "chroma-keying amplifier" can be realized by replacing the "special effects" waveform generator 60 with a desired non-composite video signal source such as a chroma-keying generator. Further, as a variant of the second embodiment, the special effects waveform generator may be designed to develop an output whose pulsewidth extends beyond the interval 52, requiring that circuit for eliminating the signal in the interval 52 in FIG. 2 be provided at the input of the phase-splitting circuit 63 of FIG. 3. Moreover, as a variant of the third embodiment, the non-composite monochrome "letter" signal may be replaced with a desired composite video signal source, provided a circuit for eliminating the sync signal and the color burst and chrominance component of the video signal be provided at the input of the phase-splitting circuit of FIG. 3.

As a fifth embodiment of this invention (not shown) a video mixing and special effects amplifier consisting of the same video signal circuit as illustrated in FIG. 1 or FIG. 3 and a keying signal processor provided with a combination of any two functions of the first through the fourth embodiments can be designed.

The most noteworthy example belonging to this case is obviously a "video mixing and special effects" amplifier provided with the dual functions of "video mixing" and "special effects." The maximum benefits of this invention can, of course, be derived from such amplifiers as designed for application to color composite signals.

As is apparent from the foregoing description, the principle field of application for the present invention is the processing of color composite signals. However, this invention may be practiced regarding monochrome composite signals (consisting of only the video and sync signals), and also as to color non-composite signals (consisting of video signals with the chrominance component and the color burst). In the former case, the circuit structure of this invention as mentioned previously referring to the color composite signal may be used without modification. In the latter case, the circuit structure must be modified as follows:

1. the sync signal for triggering the input of the keying signal processor must be of external origin;

2. apparatus for mixing the sync signal with the video signal must be provided after the video mixer for converting the video signal output of the video mixer into a color composite signal.

Although the advantages for this invention in this latter case will be considerably limited (accomplishing only the third object of this invention noted above), they nevertheless are important and very worthwhile.

Furthermore, the number of video signal channels has been assumed to be "two" in number in the above-mentioned embodiments. However, the number may be three or more, provided that the increased number contribute to improvements in the video signal transmission performance.

While the principles of this invention have been described in connection with several embodiments, it is to be clearly understood that the description is made by way of example and not limitation as to the scope of this invention as set forth in the accompanying claims.

What is claimed is:

1. A video mixing/special effect amplifier for television signals comprising a video signal and at least one control signal; a plurality of like circuit arrangements connected in parallel, each of said arrangements comprising a serially connected combination of a video clamping circuit for clamping the blanking level of a television signal applied thereto at a predetermined potential, and a video gain control circuit for varying the level of said television signal in accordance with a control voltage applied thereto, a video mixer connected to the outputs of said like circuit arrangements; and a keying signal processor for generating two kinds of control voltages for application to each of said video gain control circuits on a time-sharing basis, one of said control voltages controlling the level of said control signal included in said television signal, and the other of said control voltages for controlling the level only of said video signal of said television signal.

2. A combination as in claim 1, wherein said control signal comprises at least one of sync signals and color burst signals.

3. A combination as in claim 2 wherein said keying processor comprises plural control arrangements, each comprising the series connections of a keying gain control circuit, a keying signal mixer, and clamping circuit means, means for generating a periodic control signal, and switch means for connecting the output of said periodic control signal generating means to a selected one of said plural control arrangements.

4. A combination as in claim 3, further comprising logic circuit means for selectively actuating said switch means.

5. A combination as in claim 4, further comprising plural source means for supplying composite video signals to said plural like circuit arrangements.

6. A combination as in claim 1, further comprising plural source means for supplying composite video signals to said plural like circuit arrangements.

7. A combination as in claim 3, further comprising fader control means connected to said keying gain control circuits.

8. A combination as in claim 2, wherein said keying processor comprises plural parallel circuit means, each including a signal mixer and a clamping circuit serially connected thereto, a special effects waveform generator, a phase splitting circuit connecting said waveform generator to said plural parallel means, means for generating a periodic control signal, and switch means for connecting the output of said periodic control signal generating means to a selected one of said plural parallel circuit means.

* * * * *